Dec. 24, 1957  H. SIXSMITH  2,817,215
LIQUEFACTION AND DISTILLATION OF GASEOUS MIXTURES
Filed July 23, 1953
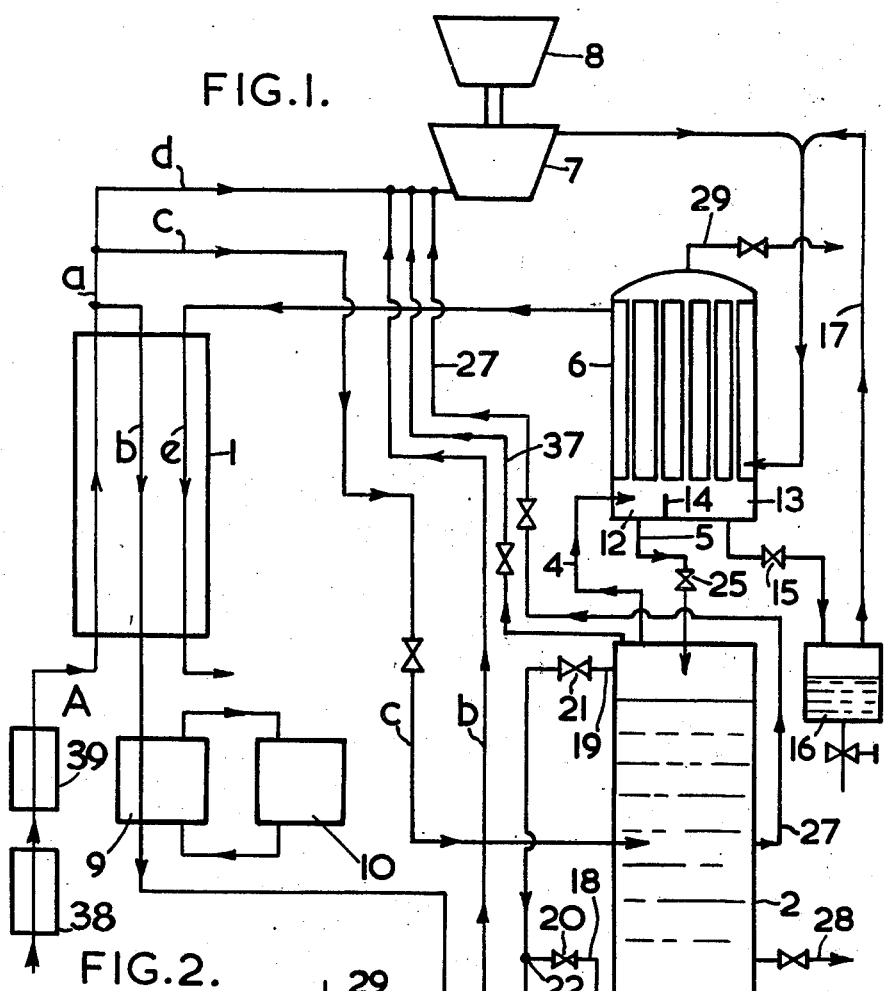
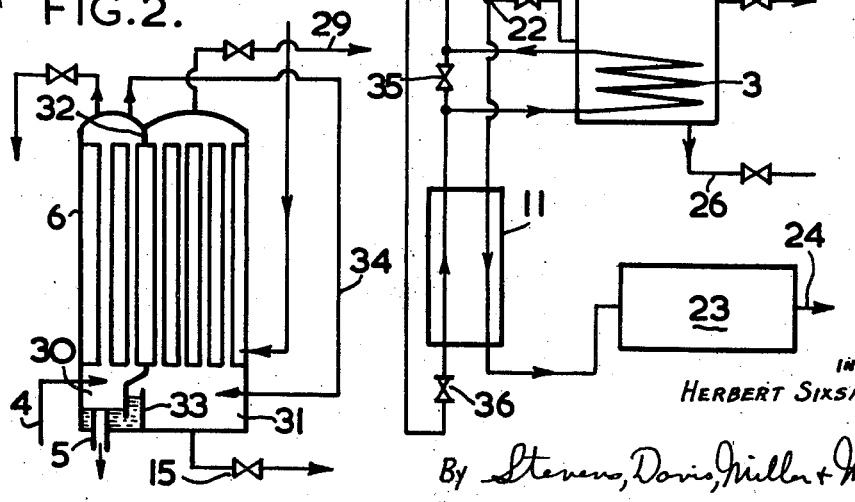
INVENTOR:
HERBERT SIXSMITH
By Stevens, Davis, Miller & Mosher
Attorneys

United States Patent Office 2,817,215
Patented Dec. 24, 1957

2,817,215

LIQUEFACTION AND DISTILLATION OF GASEOUS MIXTURES

Herbert Sixsmith, Reading, England, assignor to National Research Development Corporation, London, England, a British corporation Application July 23, 1953, Serial No. 369,919

Claims priority, application Great Britain July 28, 1952

14 Claims. (Cl. 62—123)

This invention relates to a method of and apparatus for liquefying and distilling gases, for example air.

It is known to liquefy gases by compressing the gas, expanding a part of it adiabatically, for example, in a turbine, and effecting heat exchange between the expanded and the unexpanded parts so as to condense the latter, the whole of the compressed gas being first cooled by heat exchange with the gas exhausted from the condenser.

The present invention is based on the observation that by using the condenser in such a system as the refluxing unit of a distillation column, it is possible to liquefy one or both of the constituents of a gaseous mixture in proportions which can be selected simply by the operation of flow-control valves.

The invention in one aspect thereof accordingly consists in a method of liquefying and separating the constituents of a gaseous mixture, which comprises compressing the gaseous mixture, passing a part of the compressed mixture into a distillation column at a level intermediate the top and bottom thereof, supplying heat to the lower end thereof, condensing gas issuing from the upper end thereof by heat exchange with another part of the compressed gaseous mixture cooled by adiabatic expansion accompanied by the expenditure of energy, for example in a turbine, and refluxing into the column a part of the liquid so condensed. In another aspect the invention consists in apparatus for carrying out this method.

It is preferred to cool the compressed gas by heat exchange in a first stage precooler with expanded gas exhausted from the condenser. The specification of co-pending patent application Serial No. 347,513, now Patent No. 2,760,356 describes a method of liquefying gases in which a part of the compressed gas, substantially equal in mass flow to the quantity of liquefied gas withdrawn from the system, is caused to by-pass either before entering or after recirculating through the first stage heat exchanger in which this cooling is effected. This by-passing part of the gas, which joins the portion flowing from the first stage heat exchanger to the adiabatic expansion apparatus, is necessarily at a higher temperature than the rest of the gas to be expanded. According to an important feature of the present invention, the efficiency of the present process is improved by utilising such by-passing part of the gas (in this case the gaseous mixture) to supply heat to the lower end of the distillation column.

The invention is defined in the appended claims, and one way of carrying it into effect, as applied to the liquefaction and distillation of air, will now be particularly described by way of example with reference to the accompanying drawings in which—

Fig. 1 is a flow diagram representing the method and one form of apparatus for use therein, and Fig. 2 is a fragmentary diagram of a modified form of apparatus.

Referring to Fig. 1, a main stream of air A from a compressor 38 and cooler 39 is passed through a first stage heat exchanger or precooler 1, which is preferably of the regenerative type. The stream issuing from the said heat exchanger is divided into two streams $a$ and $b$, the former being itself divided into two parts $c$ and $d$. The stream $b$ is the by-passing part hereinbefore referred to, here shown as being recirculated through the first stage precooler 1. The stream $c$ flows to an inlet at about the middle of a distillation column 2 which contains a packing of any convenient type to ensure division and mixing of the gases and liquids flowing therethrough. The packing may, for example, consist of Fenske helices.

The lower end of the column 2 is provided with a heating coil 3 through which is passed the by-passing stream of air $b$. The upper end of the column communicates by pipes 4 and 5 with one set of passages of an indirect heat exchanger or condenser 6. The other set of passages of this condenser is fed with air which has been cooled by substantially adiabatic expansion in a turbine 7 provided with an air brake 8. After passing through the condenser, this expanded air stream $e$ flows through the first stage heat exchanger 1 in counter-current to the stream A and is then discharged to atmosphere. The by-passing stream $b$ is led through the first stage heat exchanger 1 in the same sense as the stream $e$, so that on issuing therefrom it is at a higher temperature than the stream $d$ which is fed to the turbine 7. The reason for passing the by-passing part of the air twice through the first-stage heat exchanger in this manner is explained in the specification of application Serial No. 347,513.

The stream $b$, after leaving the heat exchanger, may be passed direct to the heating coil 3, but it is of thermodynamic advantage to cool it en route by heat exchange at 9 with a medium cooled by a vapour compression refrigerator 10. It is further advantageous to pass the stream $b$ en route to the coil 3 through a heat exchanger 11 through which can be passed, in counter-current, gaseous effluent from the column 2, as hereinafter described. After leaving the coil 3, the stream $b$ rejoins the stream of air $d$ flowing to the turbine 7.

The liquid condensed in the condenser 6 collects at the lower part of the condenser, which is divided into two chambers 12 and 13 by a partition 14. The part of the liquid collecting in the chamber 12 is refluxed to the column 2 by way of the pipe 5, while the part collecting in the chamber 13 is passed through a valve 15 which reduces its pressure nearly to that of atmosphere, and thence to a separating vessel 16, for example an automatic float trap of known kind. Gas escaping from the vessel 16 joins the effluent from the turbine 7 by way of a pipe 17.

The airstream $c$ entering the column 2 is subjected to a fractional distillation process such that the higher-boiling constituent, oxygen, tends to collect at the bottom, mainly in the form of a liquid, while the lower-boiling constituent, nitrogen, leaves the column as a gas through the pipe 4 and is condensed in the condenser 6. The degree of separation depends on the height of the column and can be made nearly complete with a column having a height of the order of two feet. Gaseous oxygen can be withdrawn near the bottom of the column through a pipe 18 controlled by a valve 20, and gaseous nitrogen from the top through a pipe 19 controlled by a valve 21. The pipes 18 and 19 join at 22, and the gaseous effluent passes thence through the heat exchanger 11, where it is warmed by the by-passing air stream $b$, to a constant flow device 23 from which it is discharged for utilisation at 24.

By control of the valves 15, 20 and 21 and a valve 25 in the pipe 5, the following products can be obtained:

($a$) By opening the valves 15, 25 and 20 and closing the valve 21, liquid nitrogen is obtained at the vessel 16 and gaseous oxygen at the outlet 24.

(b) By opening the valves 15 and 25 and closing the valves 20 and 21, liquid nitrogen alone is obtained.

(c) By opening the valve 25 and closing the valves 15, 20 and 21, oxygen-rich liquid air can be obtained through a discharge pipe 26 at the bottom of the column. In these conditions the whole of the condensate formed in the condenser 6 is refluxed.

(d) By opening the valves 25 and 21 and closing the valves 15 and 20, liquid oxygen and gaseous nitrogen can be obtained.

(e) By closing the valves 25, 20 and 21 and opening the valve 15, liquid air is obtained at 16. The closing of the valve 25 effectively puts the column 2 out of operation. It will be noted that the liquid air obtained in this way is slightly richer in oxygen than is atmospheric air, owing to the evaporation of nitrogen which occurs on expansion in the valve 15.

The amount of heat supplied by the coil 3 can be adjusted by means of a short-circuiting valve 35, across the heating coil connections. Thus, for example, where liquid oxygen is withdrawn at 26, less heat is required and a greater proportion of the air stream *b* is short-circuited through the valve 35.

In order to obtain maximum purity without having to withdraw oxygen and nitrogen from the system in atmospheric proportions, the air fed to the column in the stream *c* is preferably in excess of the products withdrawn, and the balance, which may contain an excess of either constituent, is taken out of the column through a pipe 27 and returned to the stream *d* entering the turbine.

In order to increase the oxygen content of the liquid drawn off through the discharge pipe 26 (as described in paragraph (c) above) it is preferred to take advantage of the fact that, when the gaseous and liquid phases are in equilibrium at a given temperature, the nitrogen content of the liquid phase is less than that of the gaseous phase. Thus by maintaining such equilibrium conditions in the column, the refluxed liquid falling to the bottom of the column will have a minimum nitrogen content. This is achieved by arranging that the incoming air is in excess of that liquefied, the excess air rising through the column in counter-current to the refluxed condensate, so that oxygen condenses out of it whilst nitrogen evaporates from the refluxed liquid. The gas reaching the top of the column is thus nitrogen-rich. The excess gas is withdrawn from the top of the column through a valve-controlled pipe 37 and fed direct to the input to the turbine 7. When this circuit is in operation, the valve in the circuit 27 is closed. The remainder of the gas is condensed and refluxed, the liquid falling to the bottom of the column 2 having a greater concentration of oxygen than when the pipe 37 is closed.

A gaseous fraction rich in argon may be withdrawn via a pipe 28 near the bottom of the column, while a gaseous fraction rich in neon and helium may be withdrawn through a pipe 29 at the top of the condenser 6.

It will be understood that the mass flow of the by-passing stream *b* should be as nearly as possible equal to the difference between the mass flows of the streams A and *c* flowing through the heat exchanger 1. It is therefore made equal to the mass flow of the whole of the products, liquid and gaseous, other than the expanded stream *e*, which leave the system. Control of the stream *b* is effected by means of a valve 36 in the inlet to the heat exchanger 11.

Further purification of the liquid nitrogen can be obtained by the modification shown in Fig. 2. In this modification the high pressure part of the condenser 6 is divided into two gas-tight chambers 30 and 31 by a partition 32 and a gas trap 33 which allows liquid but not gas to flow from one chamber to the other. The top of the chamber 30 is connected to the bottom of the chamber 31 by a pipe 34. Part of the gas entering the chamber 30 from the column 2 condenses in this chamber, and the condensate, which is refluxed to the column via the pipe 5, contains most of the small quantity of oxygen present in the gas. Thus purified nitrogen gas flows through the pipe 34 to the chamber 31 where it condenses and can be withdrawn via the valve 15. If desired, purified gaseous nitrogen may be withdrawn from the chamber 31 through the pipe 29.

I claim:

1. The method of liquefying a gas, or one or more constituents of a gaseous mixture, which comprises compressing the gas, precooling the compressed gas, dividing the precooled compressed gas into at least three parts, passing a first part into a distillation column at an intermediate level, condensing gas issuing from the upper end of the column by passing said gas in heat exchange relation in a condenser, with a second part of the precooled compressed gas after that second part has been cooled by adiabatic isentropic expansion, refluxing into the column a part of the condensate so produced, passing expanded gas exhausted from the condenser through a precooler for precooling the compressed gas as aforesaid and passing a third part of the precooled compressed gas to a heat exchanger to supply heat to the lower end of the column.

2. The method claimed in claim 1 wherein provision is made for drawing off at will from the distillation column at appropriate levels thereof, gaseous or liquid constituents of the original gas or gas mixture.

3. The method according to claim 2 with provision whereby a relatively high boiling point constituent of the compressed gas may be drawn off from the distillation column at a level below the intermediate level at which the first part of the precooled compressed gas is introduced, whereby a relatively low boiling point constituent of the compressed gas may be drawn off from the distillation column at a level above the said intermediate level and whereby a relatively lower still boiling point constituent of the compressed gas may be drawn off from the upper end of the condenser.

4. Apparatus for liquefying a gas comprising a precooler having a first circuit for cooling compressed gas, and a second circuit for cooling fluid, means for dividing the precooled compressed gas into at least three parts, a distillation column, a connection from a first outlet of the dividing means to an intermediate level of the distillation column, a condenser with a first circuit for a cooling fluid and a second circuit for a fluid to be cooled, an adiabatic expansion turbine having an inlet for compressed gas and an outlet for cooled and expanded gas, a connection from a second outlet of the dividing means to the inlet of the turbine, a connection from the outlet of the turbine to the inlet of the first circuit of the condenser, a connection from the outlet of the first circuit of the condenser to the second circuit of the precooler, a connection from the upper end of the column to the second circuit of the condenser, a connection from the second circuit of the condenser to the column for refluxing part of the condensate from the condenser, a heat exchanger in the lower end of the column, and a connection from a third outlet of the dividing means to an inlet of the said heat exchanger.

5. Apparatus according to claim 4 comprising in the precooler a heating path and connections whereby that path is inserted in the connection between the third outlet of the dividing means and the inlet of the heat exchanger in the lower end of the column, and a connection from an outlet of said heat exchanger to the inlet of the turbine.

6. Apparatus according to claim 5 comprising a closed-circuit refrigerator with a heat-extracting circuit having connections thereto and therefrom inserting the same into the connection between the third outlet of the precooler and the inlet of the heat exchanger at the lower end of the column, and a valve-controlled, short-circuiting connection between the inlet and outlet of the heat exchanger in the lower end of the column.

7. Apparatus according to claim 5 comprising a further heat exchanger having a circuit with connections to the column for passage of effluent gases from the column and a heat-extracting circuit with connections thereto and therefrom inserting that circuit into the connections between the third outlet of the precooler and the inlet of the heat exchanger at the lower end of the column, and a valve-controlled, short-circuiting connection between the inlet and outlet of the heat exchanger in the lower end of the column.

8. Apparatus according to claim 5, comprising a closed-circuit refrigerator with a heat-extracting circuit having connections thereto and therefrom inserting the same into the connection between the third outlet of the precooler and the inlet of the heat exchanger at the lower end of the column, a further heat exchanger having a circuit with connections to the column for passage of effluent gases from the column and a heat-extracting circuit with connections thereto and therefrom inserting that circuit into the connections between the third outlet of the precooler and the inlet of the heat exchanger at the lower end of the column, said closed-circuit refrigerator and said further heat exchanger having their heat-extracting circuits connected in series in the connection between the third outlet of the dividing means and the heat exchanger in the lower end of the column, and a valve-controlled, short-circuiting connection between the inlet and outlet of the heat exchanger in the lower end of the column.

9. Apparatus as claimed in claim 4 comprising a first valve-controlled outlet from the column at a level below the intermediate level to which the first outlet of the dividing means is connected, a second valve-controlled outlet from the column at a level above the said intermediate level and a third valve-controlled outlet from the upper end of the condenser.

10. Apparatus according to claim 4 wherein the condenser has a valve-controlled outlet at its upper end for permitting the drawing off of a correspondingly low boiling point constituent of the inlet gas to the fractional distillation column.

11. The method of liquefying a gas, or one or more constituents of a gaseous mixture, which comprises compressing the gas, precooling the compressed gas, dividing the precooled compressed gas into at least three parts, passing a first part into a distillation column at an intermediate level, condensing gas issuing from the upper end of the column by passing said gas in heat exchange relation in a condenser, with a second part of the precooled compressed gas after that second part has been cooled by adiabatic expansion, refluxing into the column a part of the condensate so produced, passing expanded gas exhausted from the condenser through a precooler for precooling the compressed gas as aforesaid and passing a third part of the precooled compressed gas to a heat exchanger to supply heat to the lower end of the column, the said third part of the precooled compressed gas being heated by recirculation through the precooler and after passing through the heat exchanger at the lower end of the distillation column the said third part being reunited with the second part of the precooled compressed gas, the two parts then entering the adiabatic expansion stage the cooled and expanded exhaust from which enters the condenser.

12. The method of liquefying a gas, or one or more constituents of a gaseous mixture, which comprises compressing the gas, precooling the compressed gas, dividing the precooled compressed gas into at least three parts, passing a first part into a distillation column at an intermediate level, condensing gas issuing from the upper end of the column by passing said gas in heat exchange relation in a condenser, with a second part of the precooled compressed gas after that second part has been cooled by adiabatic expansion, refluxing into the column a part of the condensate so produced, passing expanded gas exhausted from the condenser through a precooler for precooling the compressed gas as aforesaid and passing a third part of the precooled compressed gas to a heat exchanger to supply heat to the lower end of the column, the said third part of the precooled compressed gas being heated by recirculation through the precooler and after passing through the heat exchanger at the lower end of the distillation column the said third part being reunited with the second part of the precooled compressed gas, the two parts then entering the adiabatic expansion stage the cooled and expanded exhaust from which enters the condenser, the said third part of the precooled compressed gas being cooled before supplying heat to the lower end of the column by passing it through a heat exchanger in a closed-circuit refrigerator, provision being made for short-circuiting the heat exchanger in the lower end of the column and for controlling the flow through the short circuit to vary the amount of heat supplied to the lower end of the column.

13. The method of liquefying a gas, or one or more constituents of a gaseous mixture, which comprises compressing the gas, precooling the compressed gas, dividing the precooled compressed gas into at least three parts, passing a first part into a distillation column at an intermediate level, condensing gas issuing from the upper end of the column by passing said gas in heat exchange relation in a condenser, with a second part of the precooled compressed gas after that second part has been cooled by adiabatic expansion, refluxing into the column a part of the condensate so produced, passing expanded gas exhausted from the condenser through a precooler for precooling the compressed gas as aforesaid and passing a third part of the precooled compressed gas to a heat exchanger to supply heat to the lower end of the column, the said third part of the precooled compressed gas being heated by recirculation through the precooler and after passing through the heat exchanger at the lower end of the distillation column the said third part being reunited with the second part of the precooled compressed gas, the two parts then entering the adiabatic expansion stage the cooled and expanded exhaust from which enters the condenser, the said third part of the precooled compressed gas being cooled before supplying heat to the lower end of the column by passing it through a heat exchanger in the circuit of the effluent gases from the column, provision being made for short-circuiting the heat exchanger in the lower end of the column and for controlling the flow through the short circuit to vary the amount of heat supplied to the lower end of the column.

14. The method of liquefying a gas, or one or more constituents of a gaseous mixture, which comprises compressing the gas, precooling the compressed gas, dividing the precooled compressed gas into at least three parts, passing a first part into a distillation column at an intermediate level, condensing gas issuing from the upper end of the column by passing said gas in heat exchange relation in a condenser, with a second part of the precooled compressed gas after that second part has been cooled by adiabatic expansion, refluxing into the column a part of the condensate so produced, passing expanded gas exhausted from the condenser through a precooler for precooling the compressed gas as aforesaid and passing a third part of the precooled compressed gas to a heat exchanger to supply heat to the lower end of the column, the said third part of the precooled compressed gas being heated by recirculation through the precooler and after passing through the heat exchanger at the lower end of the distillation column the said third part being reunited with the second part of the precooled compressed gas, the two parts then entering the adiabatic expansion stage the cooled and expanded exhaust from which enters the condenser, the said third part of the precooled compressed gas being cooled before supplying heat to the lower end of the column by passing it through a heat exchanger in a closed-circuit refrigerator and in the circuit of the effluent gases from the column, provision being made for short-circuiting the heat exchanger in the lower end of the column and for controlling the flow through the short circuit to vary the amount of heat supplied to the lower end of the column.

References Cited in the file of this patent

UNITED STATES PATENTS

| | | |
|---|---|---|
| 1,068,219 | Claude | July 22, 1913 |
| 1,512,268 | Barbet | Oct. 21, 1924 |
| 2,409,458 | Van Nuys | Oct. 15, 1946 |
| 2,497,421 | Shiras | Feb. 14, 1950 |
| 2,525,660 | Fausek | Oct. 10, 1950 |
| 2,545,778 | Harlinghuizen | Mar. 20, 1951 |
| 2,553,469 | Pellettere | May 15, 1951 |
| 2,556,850 | Ogorzaly | June 12, 1951 |
| 2,579,498 | Jenny | Dec. 25, 1951 |
| 2,584,985 | Cicalese | Feb. 12, 1952 |
| 2,657,243 | Giraitis | Oct. 27, 1953 |
| 2,729,953 | Schilling | Jan. 10, 1956 |

FOREIGN PATENTS

| | | |
|---|---|---|
| 610,024 | France | Aug. 28, 1926 |